Patented Nov. 11, 1952

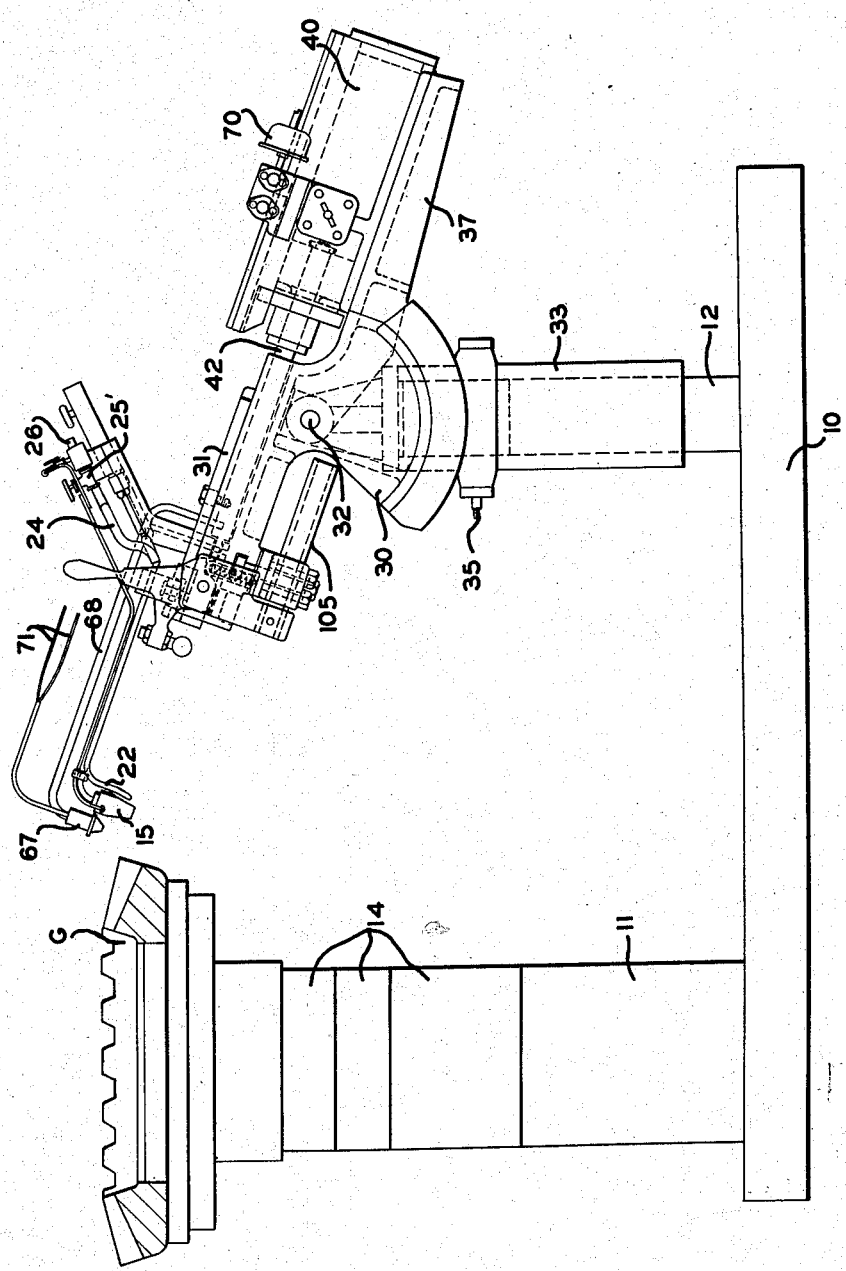

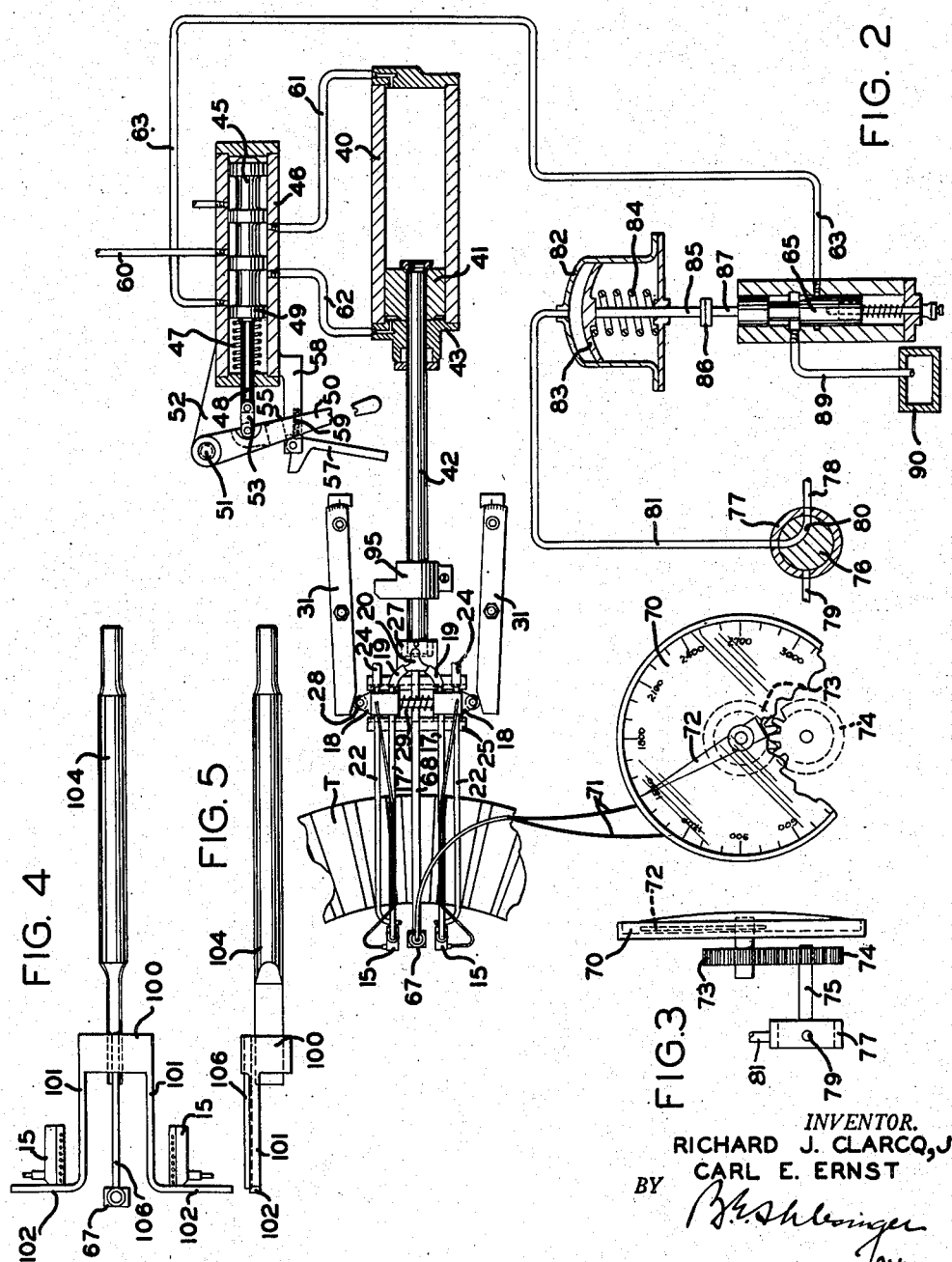

2,617,643

UNITED STATES PATENT OFFICE 2,617,643

SURFACE HARDENING MACHINE

Richard J. Clarcq, Jr., Rochester, and Carl E. Ernst, Brighton, N. Y., assignors to Gleason Works, Rochester, N. Y., a corporation of New York Application March 18, 1950, Serial No. 150,476

3 Claims. (Cl. 266—5)

The present invention relates to apparatus for surface-hardening gears and more particularly to machines for surface-hardening bevel and hypoid gears.

In conventional machines for hardening gears, hardening is effected by traversing a torch or a pair of torches along the length of a tooth and immediately quenching the heated tooth by spraying oil or water on it, or allowing it to air harden. The travel of the torches can be adjusted for any predetermined speed, either uniform or varying.

The teeth of bevel and hypoid gears, ordinarily decrease in thickness and in height from their outer to their inner ends. In conventional machines for hardening such gears, therefore, the travel of the torch or torches is accelerated as the torches move from the large end to the small end of a tooth, and the torches are also moved in paths converging from the large to the small end of the tooth. The purpose is to raise the tooth to a uniform temperature all along its length as closely as possible so as to obtain as nearly as possible uniform hardening along the tooth.

In machines as heretofore constructed, however, there has been no way to compensate for variations in the rate of heat absorption by the work due to variations in the volume of metal adjacent to the tooth being heat-treated. The rapidity with which the tooth, that is to be hardened, reaches its critical temperature is strongly affected by the rate of absorption of the heat into adjacent parts which are not to be heat treated. It is obvious that a part of a tooth to be hardened requires a shorter period under the flame in order to reach its critical temperature, if the adjacent sections of the workpiece are thin and cannot carry the heat away quickly, than another part of a tooth which is adjacent parts that are thicker and that have, therefore, greater capacity for carrying away the heat.

Heretofore, it has been a matter of judgment and of manual adjustment in setting the machine to obtain the best results possible in varying the speed of travel of the torches in conformity with the rate of heat absorption. If there is a variation in the intensity of the flame, however, even under the best of conditions, the result is an improperly heat-treated piece.

The primary object of the present invention is to provide means for controlling automatically the speed of travel of the torches in a surface-hardening machine so as to obtain uniform intensity of the heat all along the length of a gear tooth or other part, which is to be hardened, regardless of variation in shape of the tooth along its length and regardless of the shape and heat absorption characteristics of the parts adjacent to the tooth.

Another object of the invention is to provide control mechanism for a machine for surface-hardening gear teeth and the like in which uniformity of heat-treatment all along the length of a tooth may be obtained regardless of any variation in the intensity of the flame during the travel of the torch along the length of the tooth.

A further object of the invention is to provide a control mechanism for the speed of travel of the torches in a surface-hardening machine through which the machine may be set up entirely by gauges, and no judgment on the part of the operator in determining the speed of movement will be required.

Other objects of the invention will be apparent hereinafter from the specification and from the recital of the appended claims.

The invention has been shown as applied to a machine of the general type disclosed in the Slade U. S. Patent No. 2,102,040, granted December 14, 1937, but it is not restricted to such use.

In the drawings:

Fig. 1 is a side elevation of a surface-hardening machine of the general type shown in the Slade patent above mentioned but modified in accordance with the principles of the present invention;

Fig. 2 is a diagrammatic view illustrating the construction and principle of operation of this modified form of machine;

Fig. 3 is a side elevation showing the control gauge of the machine and the gearing which connects this gauge to the control valve;

Fig. 4 is a plan view showing the two torches of the machine, and the gauge for setting the positions of the controlling pyrometer relative to the torches; and Fig. 5 is a side elevation of this setting gauge.

Referring now to the drawings by numerals of reference, 10 denotes the base of the machine, while 11 and 12 designate two columns which project upwardly from the base. The gear G, which is to be hardened, is adapted to be mounted upon the top of the column 11. The distance of the work above the base of the machine can be adjusted, as is required for gears of different sizes and different types, by use of internesting rings of which three are shown at 14 in Fig. 1. The gear G here shown is a bevel gear and it has its teeth T (Fig. 2) which decrease in width and height from their outer to their inner ends.

For surface hardening opposite sides of a tooth of the gear simultaneously, two torches 15 are provided. These torches are secured to two oxyacetylene feed pipes 17, respectively, which are secured in two blocks 18, respectively, and which are connected by tubing 19 with a feed pipe 20, only a fragment of which is shown in Fig. 2. The gas mixture is supplied to this pipe in any suitable way.

The torches are adapted to move in the hardening operation along the length of each tooth from one end thereof to the other. For preheating a tooth the torches may be moved rapidly from the small end to the large end of the tooth, but for the hardening operation they are preferably moved slowly from the large to the small end of the tooth. The sides of a tooth are quenched immediately after they are heated to the hardening temperature, and as the torches move progressively along the tooth from one end to the other, by spraying jets of water on the tooth. To this end, a pair of spray pipes 22 are provided. These pipes are bent at their delivery ends to direct the liquid used as the quenching medium on the tooth surfaces at points immediately behind the torches. The pipes 22 are also secured in the blocks 18. These pipes are connected by means of flexible hoses 24 with a manually operable valve 25' to which the water is supplied by a pipe 26, which is shown only fragmentarily.

The blocks 18 are slidable transversely in ways formed in the head 25 of a ram 27. They are pressed outwardly by a spring 29 and carry at their outer ends rollers 28 which ride on guide rails 31. These guide rails are adjustable angularly in accordance with the taper in width from end to end of the teeth of the gear to be hardened so that the torches and quenching jets may remain at substantially uniform distances from opposite sides of a tooth as they travel, under actuation of the ram, from one end of the tooth to the other.

The ram 27 reciprocates in ways formed in a supporting bracket 30. This bracket is trunnioned by means of a pin 32 on the head of a cylinder 33 which is carried by the column 12. A worm which is secured to a manually operable shaft 35 and which engages with a worm wheel segment (not shown) that is secured to the rocker member 30 serves for effecting angular adjustment of the rocker member to position the torches at the correct angular relationship to the work in accordance with the pitch cone angle thereof.

Mounted upon an extension 37 of the bracket 30 is a cylinder 40. Reciprocable in this cylinder is a piston 41. This piston is secured to one end of a piston rod 42 which projects through one end plate 43 of the cylinder and which is connected at its opposite end to the ram 27.

The direction of movement of the piston 41 and of the ram 27 is controlled by a valve 45 which is reciprocable in a valve casing 46. The valve 45 is constantly urged to the right in the casing 46 by a coil spring 47 which surrounds the valve stem 48 and which is interposed between the left hand end wall of the casing and the collar portion 49 of the valve. The valve is shifted manually in the opposite direction by a hand-lever 50. This lever is pivoted at 51 on a plate 52 which is formed integral with the valve casing 46. This lever is connected with the valve stem 48 by a link 53.

The valve is adapted to be releasably locked in the position to which it is moved manually. For this purpose the lever 50 is formed with a lug 55. This is adapted to be engaged by a lock-dog 57. The lock dog 57 is pivotally mounted on a bracket 58 which extends from the casing 46. The lockdog is constantly pressed toward locking position by a spring-pressed plunger 59 which is housed in the bracket 58.

When the valve 45 is in the position shown, the pressure fluid, which is supplied from the pipe 60, flows through the duct 61 to the right hand end of the cylinder 40, and the left hand end of this cylinder is on exhaust through the duct 62 and the duct 63. The parts are shown in Fig. 2 at the end of the hardening stroke of the ram 27.

In the hardening stroke, the rate of movement of the ram is controlled by a throttle valve 65.

So far as has been described, the machine of the present invention is constructed and operates like the machine disclosed in the Slade patent above mentioned; and reference may be had to that patent for a more detailed description of the construction and operation of the several parts so far described herein.

In the machine disclosed in the Slade patent the throttle valve is cam-actuated. In the machine of the present invention, the throttle valve 65 is controlled automatically from the temperature of the workpiece which is being hardened and more specifically from the temperature along the length of the tooth as the tooth is heated up along its length. For this purpose there is mounted between the two burners 15 the thermocouple 67 of a conventional pyrometer. This thermocouple is carried by an arm 68 which is secured in the ram 27.

The thermocouple is operatively connected with a dial thermometer 70 by lines 71. The dial thermometer has a needle 72 which reads against the graduations provided on the dial. The dial thermometer is also connected through gearing 73, 74 with a shaft 75 to which is secured a rotary valve 76. This valve rotates in a casing 77. Air is supplied to this casing from a line 78. It is exhausted from the casing through a line 79. In the position shown in Fig. 2, the air passes through the duct 80 in the valve 76 to a line 81 which leads to the upper end of a casing 82 in which is mounted a piston 83. A coil spring 84, which surrounds the rod 85, that is secured to this piston, constantly presses the piston upwardly. The rod 85 is connected through a suitable coupling 86 and rod 87 to the throttle valve 65.

The thermocouple 67 is positioned to be adjacent the top of the tooth, which is being hardened, and travels under actuation of ram 27 along the top of the tooth from one end thereof to the other as the torches 15 travel along the sides of the tooth and heat up the tooth. Hence, as the piston 41 travels from right to left in the hardening stroke, the pyrometer controls the speed of that travel. The travel is controlled, moreover, in such wise that all parts of the tooth from end to end are heated to a desired uniform temperature. Of course, a part which is of thinner section or smaller height will heat faster than a part which is of thicker section or greater height. Hence, the speed of travel of the ram will be accelerated during hardening of the thinner-sectioned, small-height part of the tooth. The pyrometer will by gauging the temperature of the tooth turn the valve 76 in one direction or other as required, as the torches move along the length of a tooth, so that all parts of the tooth from end to end will be heated to a uniform desired temperature. Rotation of the valve 76 controls the air supply to the cylinder 82, thereby controlling the position of the throttle valve 65, which, in turn, controls the rate of exhaust of the hydraulic motive fluid through duct 63 from the left hand end of the cylinder 40, thereby controlling the rate of movement of ram 27 and torches 15. The duct 63 is connected by the throttle valve 65 with an exhaust duct 89 that leads to the sump 90 of the machine.

At the end of the hardening stroke, the work can be indexed, and the valve 45 can be reversed to produce a return or preheating movement of the ram 27, by shifting the lever 50 clockwise about its pivot 51. The lock-dog 57 then engages and holds the lever in this latter position until the end of the return movement of the piston 41. The trip dog 95, which is adjustably mounted upon the piston rod 42, engages the detent 57 at the end of the return stroke of piston 41, to disengage that detent from the dog 55. The spring 47 then shifts the valve 45 back to the position shown in Fig. 2; and a new hardening stroke begins automatically.

For best results, the thermocouple 67 must be positioned accurately between and with reference to the two torches 15. For this purpose a setting gauge may be used such as shown in Figs. 4 and 5. This gauge has a body portion 100 from which project two parallel arms 101 that have portions 102 at their free ends bent at right angles to engage the front faces of the torches 15. The bracket also carries a rod 106 which is adapted to abut against the thermocouple 67. The bracket 100 is carried by a bar 104 which may be positioned within a socket 105 (Fig. 1) of the machine.

While the invention has been described in connection with a particular embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A surface hardening machine for hardening gear teeth comprising a work support, a reciprocable ram, a pair of laterally spaced torches mounted on said ram in positions to direct flames at opposite tooth sides of the work at substantially laterally aligned areas of said opposite tooth sides, means for actuating the ram to move the torches longitudinally along said top of the tooth sides, a temperature-sensitive element mounted on the ram laterally between the two torches to be adjacent the tooth being hardened and to be disposed in approximate lateral alignment with said torches to sense the part of the tooth being heated by said torches, and means operatively connecting said element to the means for moving the ram to control the rate of movement of the ram.

2. A surface hardening machine for hardening gear teeth comprising a work support, a reciprocable ram, a pair of laterally spaced torches mounted on said ram in positions to direct flames at opposite sides of a tooth of the work at substantially laterally aligned areas of said opposite tooth sides, a temperature-sensitive element mounted on said ram laterally between said torches and adjacent the top of the tooth being hardened and disposed in approximate lateral alignment with said torches to sense the part of the tooth being heated by the torches, fluid-pressure operated means for moving said ram to move said torches longitudinally of the tooth, a throttle valve controlling the rate of said movement, and means operatively connecting the throttle valve to said element to vary the position of the throttle valve under control of said element.

3. A surface hardening machine for hardening gear teeth comprising a work support, a reciprocable ram, a pair of laterally aligned blocks mounted on said ram to be movable transversely thereof, a torch secured in each block, the two torches being positioned to direct flames at opposite sides, respectively, of a tooth of the work, a temperature-sensitive element mounted on the ram to be adjacent the top of the tooth of the work and to be disposed in approximate lateral alignment with said torches to sense the part of the tooth being heated by the torches, fluid-pressure operated means for moving the ram to travel the torches longitudinally along the sides and said element longitudinally along the top of a tooth being hardened, a throttle valve for controlling the rate of movement of the ram, fluid-pressure operated means for moving said valve, a movable valve for controlling the last-named means, a pyrometer actuated by said element, and means operatively connecting said pyrometer to said last-named valve to control the position of said last-named valve.

RICHARD J. CLARCQ, JR.
CARL E. ERNST.

REFERENCES CITED

The following references are of record in the file of this patent:

UNITED STATES PATENTS

| Number | Name | Date |
| --- | --- | --- |
| 2,067,549 | Sykes | Jan. 12, 1937 |
| 2,102,040 | Slade | Dec. 14, 1937 |
| 2,194,909 | Moss et al. | Mar. 26, 1940 |
| 2,220,002 | Rollman et al. | Oct. 29, 1940 |
| 2,407,230 | Furkert | Sept. 10, 1946 |

FOREIGN PATENTS

| Number | Country | Date |
| --- | --- | --- |
| 445,425 | Great Britain | Apr. 8, 1936 |